(12) United States Patent
Isshiki

(10) Patent No.: US 7,050,183 B2
(45) Date of Patent: May 23, 2006

(54) IMAGE PRINTING APPARATUS CONTROL METHOD AND IMAGE PRINTING APPARATUS

(75) Inventor: Naohiro Isshiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 874 days.

(21) Appl. No.: 10/082,301

(22) Filed: Feb. 26, 2002

(65) Prior Publication Data

US 2002/0118384 A1   Aug. 29, 2002

(30) Foreign Application Priority Data

Feb. 28, 2001   (JP)   .............................. 2001-055649

(51) Int. Cl.
   *G06K 15/00*   (2006.01)
   *G06F 11/00*   (2006.01)
(52) U.S. Cl. .................. 358/1.14; 358/1.15; 358/1.16; 358/437; 714/44
(58) Field of Classification Search ............... 358/1.15, 358/437, 1.16, 1.14; 714/44
See application file for complete search history.

(56) References Cited

U.S. PATENT DOCUMENTS

| | | | |
|---|---|---|---|
| 6,678,757 B1 * | 1/2004 | Paulus et al. ................. | 710/52 |
| 2002/0048476 A1 * | 4/2002 | Kato ............................ | 400/70 |
| 2002/0067498 A1 * | 6/2002 | Chapman ................... | 358/1.13 |
| 2002/0097429 A1 * | 7/2002 | Ferlitsch .................... | 358/1.15 |
| 2003/0020944 A1 * | 1/2003 | Bhogal et al. ............. | 358/1.15 |

FOREIGN PATENT DOCUMENTS

TW   325548   1/1998

\* cited by examiner

*Primary Examiner*—Mark Zimmerman
*Assistant Examiner*—Vincent Rudolph
(74) *Attorney, Agent, or Firm*—Fitzpatrick, Cella, Harper & Scinto

(57) ABSTRACT

To prevent generation of an error caused by a print job spooled in a memory in boot processing of an image printing apparatus, a print job file left in a hard disk is checked in boot processing. When an unprocessed print job file exists, it is regarded as the cause of abnormal operation of the image printing apparatus, and deleted. This control method can prevent abnormal operation repeated by a print job file every boot processing, and subsequent boot processing.

11 Claims, 11 Drawing Sheets

HD SPOOL INITIALIZATION TASK PROCESSING IN FOURTH EMBODIMENT

NORMAL PRINT JOB PROCESSING TASK

HD SPOOL INITIALIZATION TASK PROCESSING IN FIRST EMBODIMENT

BOOT PROCESSING IN SECOND EMBODIMENT

HD SPOOL INITIALIZATION TASK IN SECOND EMBODIMENT

HD SPOOL INITIALIZATION TASK PROCESSING IN THIRD EMBODIMENT

FIG. 10

| | ID | SERVICE CALL CONTENTS |
|---|---|---|
| 910 — DEPENDENT ON PRINT JOB DATA | 1 | MEMORY OVERFLOW |
| | 2 | ABNORMAL INSTRUCTION |
| | 3 | DOWNLOAD OVERFLOW |
| | 4 | INVALID FORMAT |
| 920 — INDEPENDENT OF PRINT JOB DATA | 1001 | ABNORMAL ENGINE |
| | 1002 | ABNORMAL FIXING UNIT |
| | 1003 | ABNORMAL POWER SUPPLY |
| | 1004 | ABNORMAL ROTARY POLYGON MIRROR |

HD SPOOL INITIALIZATION TASK PROCESSING IN FOURTH EMBODIMENT

IMAGE PRINTING APPARATUS CONTROL METHOD AND IMAGE PRINTING APPARATUS

FIELD OF THE INVENTION

The present invention relates to an image printing apparatus control method, image printing apparatus, and recording medium.

BACKGROUND OF THE INVENTION

Recent image printing apparatuses for receiving a print job from a host computer and then printing the data have a function of spooling all the received print jobs (temporarily accumulating the jobs as files) in a large-capacity memory in the image printing apparatus and then analyzing the received print job data for printing in order to quickly release the host computer from print processing.

To realize this function, a hard disk (HD) is generally used as a large-capacity memory. This function is called an HD spool function.

A serious error may occur in an image printing apparatus in processing a print job spooled using the HD spool function. In this case, it is general to solve the error of the image printing apparatus, then reactivate the image printing apparatus, and perform boot processing. In this boot processing, the spooled print job is processed again.

However, when the spooled print job causes an error, the print job is reprocessed every boot processing, generating an error again. Thus, the image printing apparatus endlessly repeats boot processing.

SUMMARY OF THE INVENTION

The present invention has been made to overcome the conventional drawbacks, and has as its object to provide an image printing apparatus control method and image printing apparatus capable of preventing generation of an error caused by a print job spooled in a memory in boot processing executed in activation, resetting, or abnormal operation.

To achieve the above object, an image printing apparatus control method according to an aspect of the present invention has the following steps. That is, a control method for an image printing apparatus having a memory and spool means for temporarily storing received data as a print job file in the memory is characterized by comprising the detection step of detecting the print job file stored in the memory in boot, and the print job file delete step of deleting the print job file when the print job file stored in the memory is detected.

The boot includes boot processing performed in activation, resetting, or abnormal operation. The method further comprises the operation step of executing processing for an abnormality generated in the image printing apparatus, and the second detection step of detecting execution of the processing for the abnormality. In the print job file delete step, the print job file is deleted when execution of the processing for the abnormality is detected in the second detection step.

The method further comprises a nonvolatile memory, and the abnormality informing step of, when an abnormality occurs in the image printing apparatus, classifying contents of the abnormality into an abnormality caused by the print job file and an abnormality not caused by the print job file, and storing the contents in the nonvolatile memory. In the print job file delete step, the print job file is deleted when the abnormality is an abnormality caused by the print job file.

The abnormality caused by the print job file includes at least one of memory overflow, an abnormal instruction, download overflow, and an invalid format.

The method further comprises a nonvolatile memory for storing boot time, the boot time update step of detecting boot time, and updating the time stored in the nonvolatile memory to the detected time, and the comparison step of comparing a difference between the time stored in the nonvolatile memory and the boot time. In the print job file delete step, the print job file is deleted when the difference falls within a predetermined time.

To achieve the above object, an image printing apparatus according to another aspect of the present invention has the following arrangement. That is, an image printing apparatus having a memory and spool means for temporarily storing received data as a print job file in the memory is characterized by comprising detection means for detecting the print job file stored in the memory in boot, and print job file delete means for deleting the print job file when the print job file stored in the memory is detected.

To achieve the above object, a computer-readable storage medium according to still another aspect of the present invention has the following program codes. That is, a computer-readable storage medium which stores a control program for controlling an image printing apparatus having a memory and spool means for temporarily storing received data as a print job file in the memory, wherein the control program comprises: a code of the detection step of detecting the print job file stored in the memory in boot; and a code of the print job file delete step of deleting the print job file when the print job file stored in the memory is detected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view for explaining the contents of a service call according to the third embodiment of the present invention.

DETAILED DESCRIPTION OF THE PREFERRED EMBODIMENTS

Preferred embodiments of the present invention will now be described in detail in accordance with the accompanying drawings.

An image printing apparatus according to the present invention includes a laser beam printer and ink-jet image printing apparatus. The embodiments will exemplify a laser beam printer as an image printing apparatus.

The image printing apparatus to which the embodiments are applied is not limited to a laser beam printer and ink-jet image printing apparatus, and may be an image printing apparatus of another image printing type. The image printing apparatus to which the embodiments are applied can operate singly as an image printing apparatus and can also be applied to a composite image printing apparatus having a copying function and FAX function.

[First Embodiment]

A print job file control method as the first embodiment of the present invention will be explained. A laser beam printer as an example of an image printing apparatus of the present invention that executes the print job file control method as the first embodiment, and the arrangement of the image printing apparatus control unit of the laser beam printer will be described.

In the print job file control method, a print job file left in a hard disk is checked in boot processing. When an unprocessed print job file exists, it is regarded as the cause of abnormal operation of the image printing apparatus, and deleted. This control method can prevent abnormal operation repeated by a print job file every boot processing, and subsequent boot processing.

[Laser Beam Printer Main Body]

Figure 1:
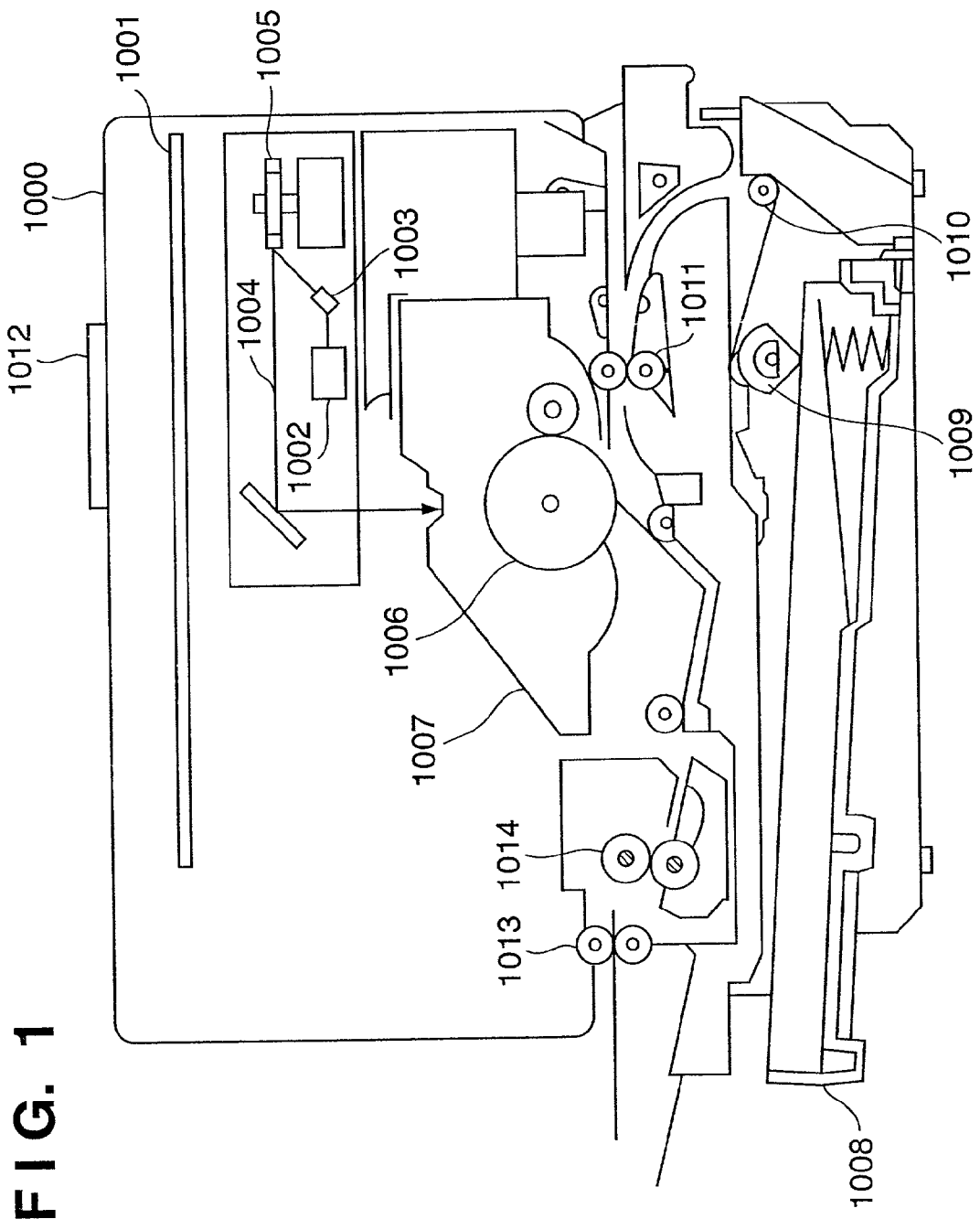
FIG. 1 is a sectional view showing the structure of a laser beam printer according to an embodiment of the present invention.

FIG. 1 is a sectional view showing the structure of a laser beam printer (LBP). In FIG. 1, reference numeral 1000 denotes an LBP main body which receives and stores print information (character code or the like), form information, a macro instruction, or the like supplied from an externally connected host computer, forms a character pattern, form pattern, or the like in accordance with the information, and prints the image on a print sheet serving as a print medium.

Reference numeral 1012 denotes an operation unit having an operation switch, LED display, and the like; and 1001, an image printing apparatus control unit for controlling the whole LBP main body 1000 and analyzing character information or the like supplied from a host computer (not shown).

The image printing apparatus control unit 1001 mainly converts character information into video signals of a corresponding character pattern, and outputs the video signals to a laser driver 1002. The laser driver 1002 is a circuit for driving a semiconductor laser 1003. The laser driver 1002 switches the ON/OFF state of a laser beam 1004 emitted by the semiconductor laser 1003 in accordance with the input video signals.

The laser beam 1004 is horizontally oscillated by a rotary polygon mirror 1005 to scan and expose an electrostatic drum 1006. Then, the electrostatic latent image of the character pattern is formed on the electrostatic drum 1006. The electrostatic latent image is developed by a developing unit 1007 which surrounds the electrostatic drum 1006, and transferred to a print sheet.

The print sheet is, e.g., a cut sheet. Cut sheets are stored in a sheet cassette 1008 set in the LBP main body 1000. A cut sheet is fed into the apparatus by a pickup roller 1009 and convey rollers 1010 and 1011, and supplied to the electrostatic drum 1006.

The toner image adhered on the electrostatic drum 1006 by the developing unit 1007 is transferred to the conveyed print sheet. The print sheet is conveyed to a fixing unit 1014 where the toner is fixed. The print sheet is finally guided to the outside by a discharge roller 1013 and discharged to the outside.

The LBP main body 1000 comprises at least one card slot (not shown) which allows connecting an optional font card in addition to a built-in font or a control card (emulation card) of a different language system.

The developing unit 1007 and electrostatic drum 1006 can achieve color printing by performing processing separately for, e.g., C (Cyan), M (Magenta), Y (Yellow), and K (blacK) colors.

[Arrangement of Image Printing Apparatus Control Unit]

Figure 2:
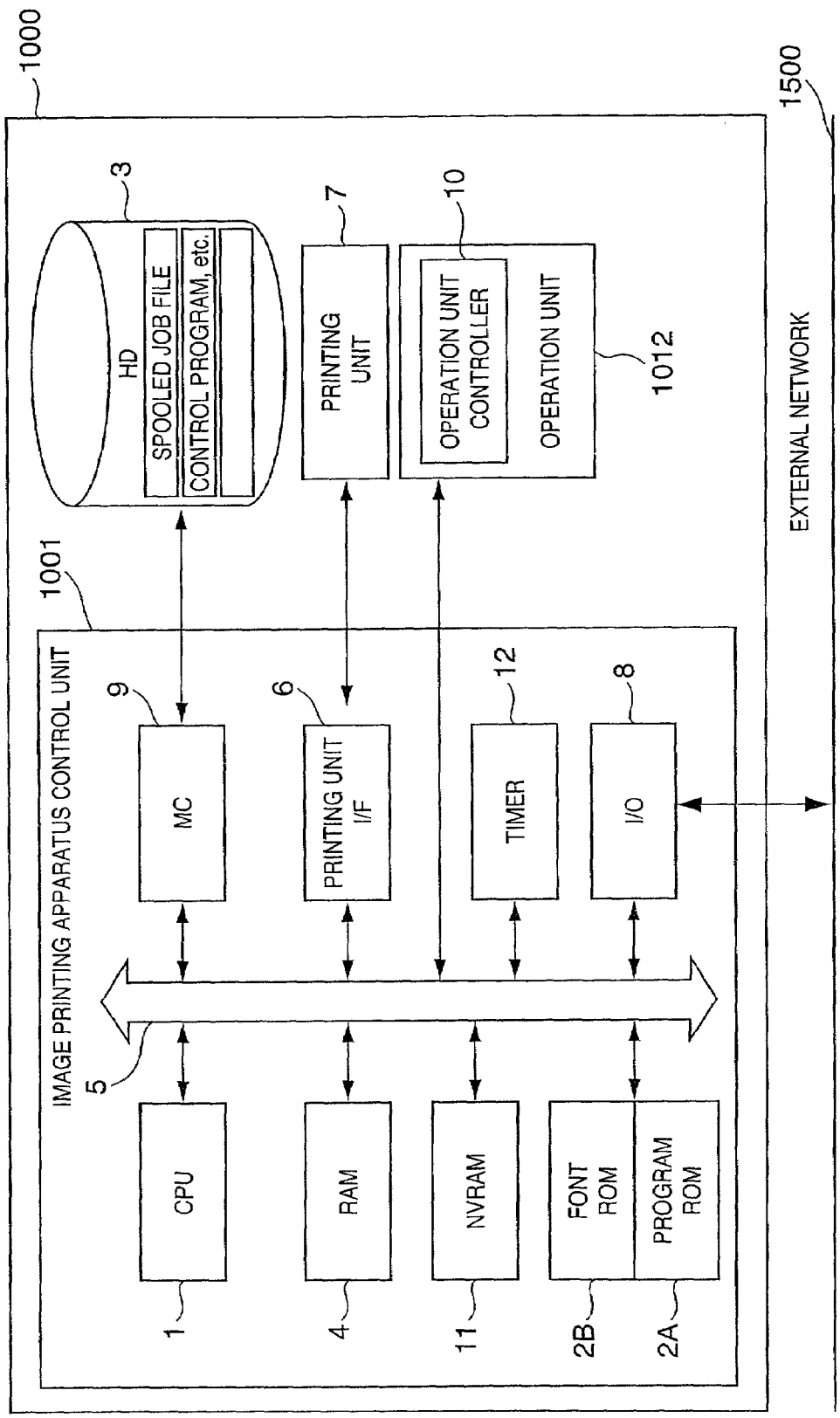
FIG. 2 is a block diagram for explaining an arrangement when print job file control according to the embodiment of the present invention is applied to the laser beam printer.

FIG. 2 is a block diagram for explaining the arrangement of the image printing apparatus control unit 1001 in the laser beam printer 1000.

FIG. 2 shows a case in which the print job file control method according to the present invention is applied to a laser beam printer. The print job file control method may be applied to a single apparatus such as an ink-jet printer instead of a laser beam printer, a system constituted by a plurality of apparatuses, or a system which performs processing via a network such as LAN. In the image printing apparatus control unit 1001, reference numeral 1 denote a CPU; and 2A, a program ROM which stores a control program.

The CPU 1 systematically controls access to various devices connected to a system bus 5 on the basis of a control program stored in the program ROM 2A or a control program which is stored in a hard disk (HD) 3 and loaded onto a RAM 4 in activation. The CPU 1 outputs an image signal as output information to a printing unit (printer engine) 7 connected via a printing unit interface 6.

Figure 4:
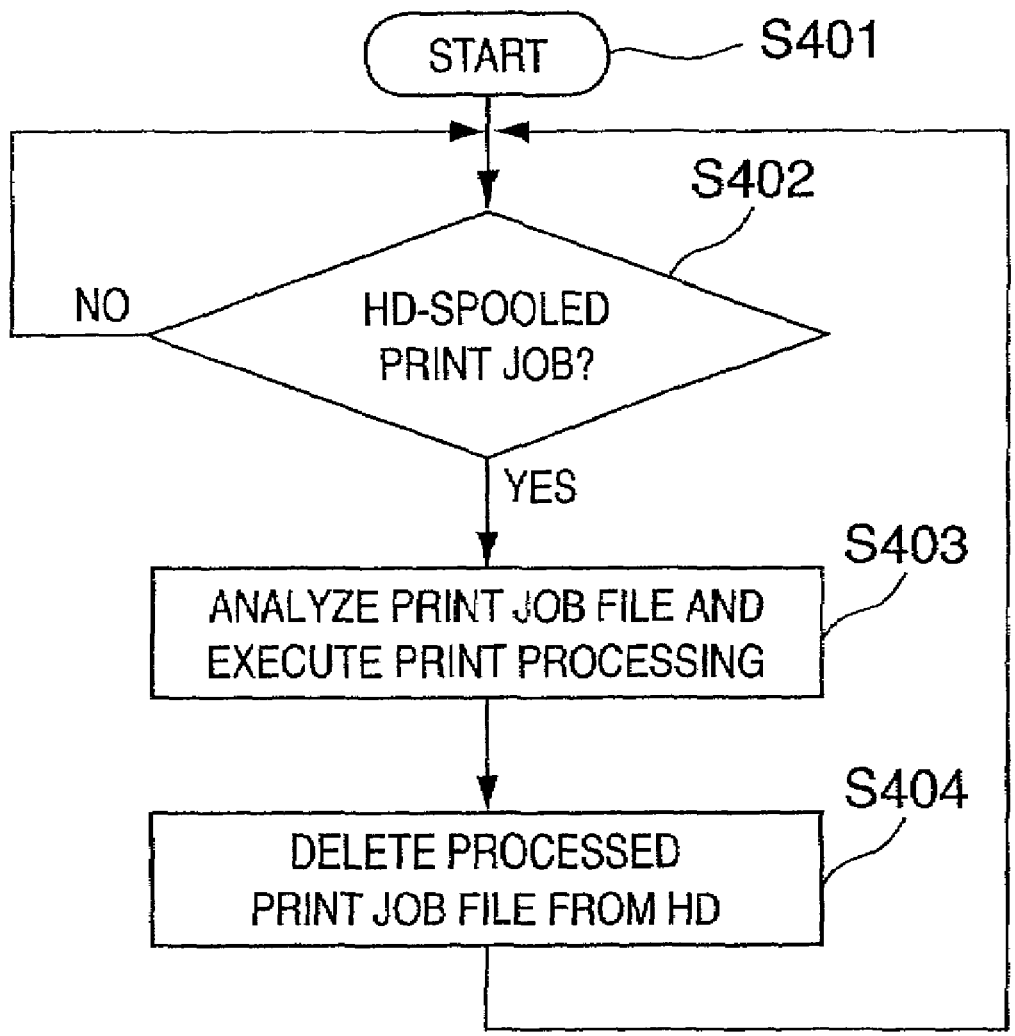
FIG. 4 is a flow chart for explaining the operation of a print job processing task according to the embodiment of the present invention.
Figure 5:
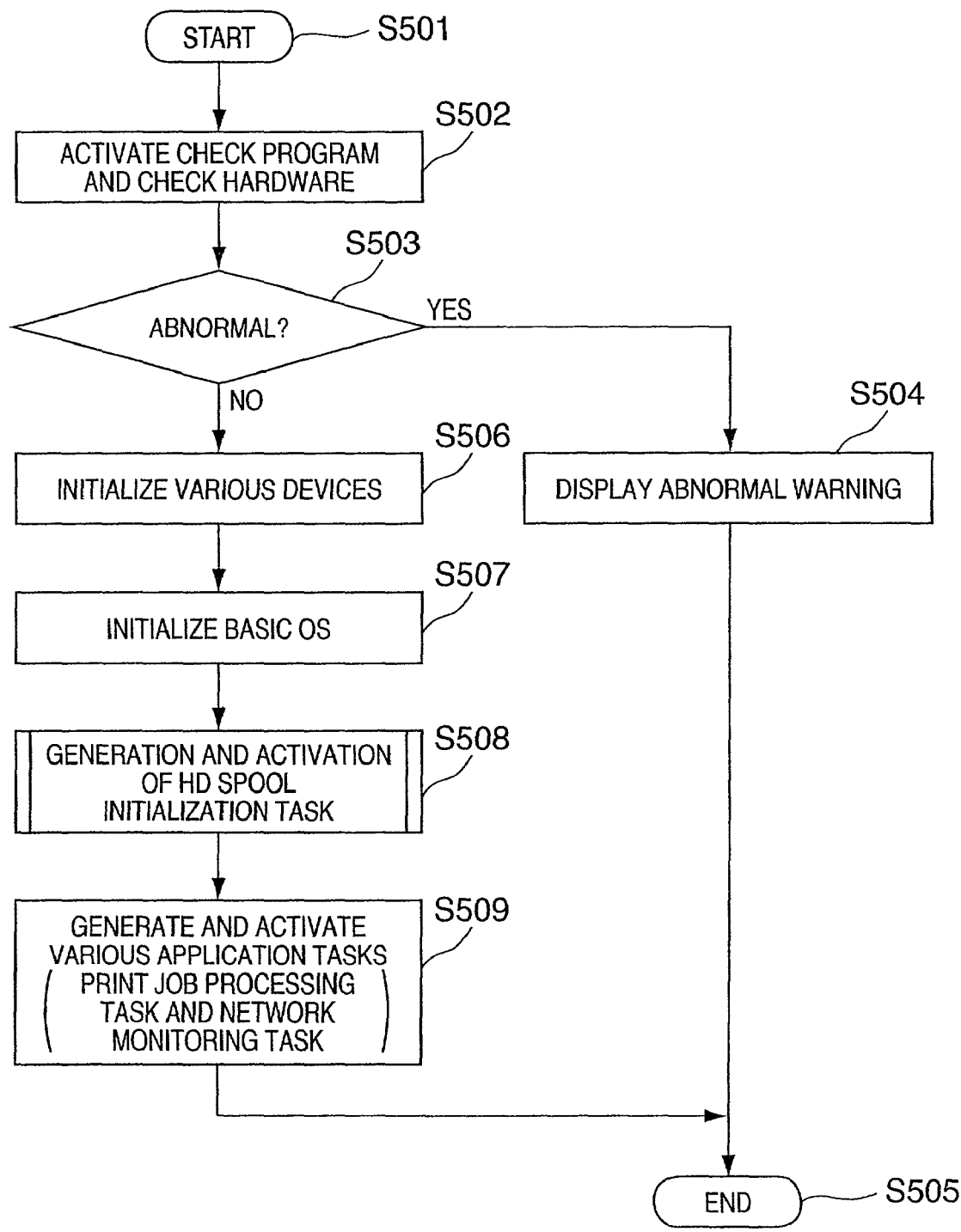
FIG. 5 is a flow chart for explaining an operation in boot processing according to the first embodiment of the present invention.
Figure 6:
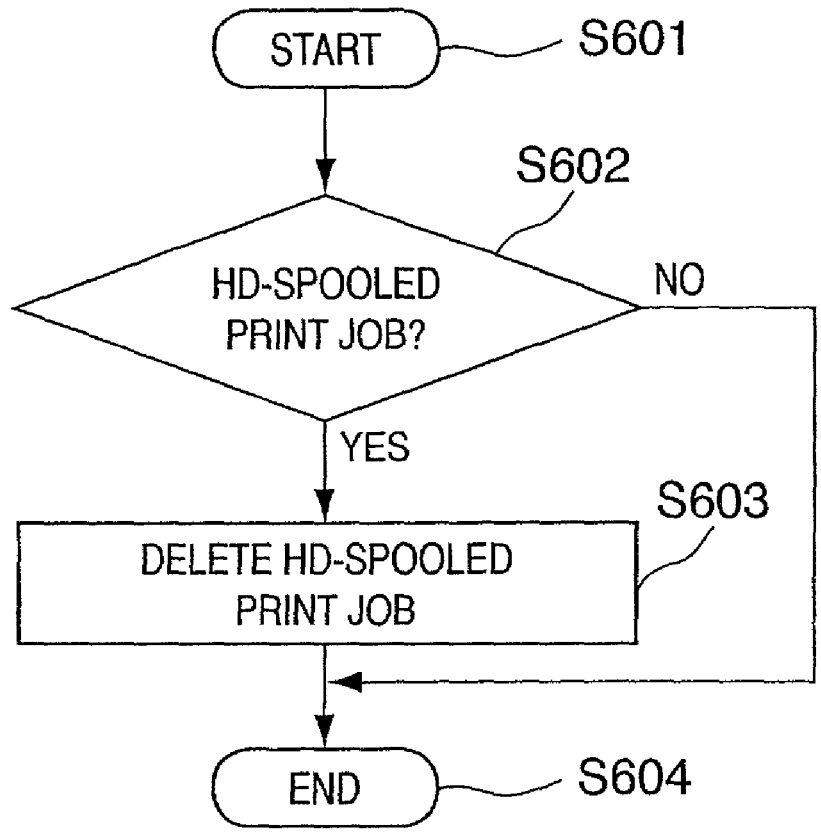
FIG. 6 is a flow chart for explaining the operation of HD spool initialization task processing according to the first embodiment of the present invention.

The program ROM 2A stores the control programs of the CPU 1 as shown in the flow charts of FIGS. 4, 5, and 6. A font ROM 2B stores font data or the like used to generate the output information.

The CPU 1 can communicate via an I/O 8 with an external device (not shown) such as a host computer connected to an external network 1500. Note that the CPU 1 communicates with an external device (not shown) via the external network 1500, but may be directly connected to the external device directly via an interface (not shown) to communicate with it.

The RAM 4 functions as a main memory, work memory, and the like. The memory capacity can be expanded by an optional RAM (not shown) connected to an expansion port. The RAM 4 is also used for an output information mapping area, environment data storage area, and the like.

Access to the HD 3 is controlled by a memory controller (MC) 9. The HD 3 stores a spooled job file, a spooled image, font data, an emulation program, form data, and the like.

The operation unit 1012 described with reference to FIG. 1 has switches for executing various operations such as emergency processing, and an LED display for displaying an abnormal state. The state of the operation unit 1012 is managed and controlled by an operation unit controller 10.

Reference numeral 11 denotes a RAM (NVRAM) as a nonvolatile memory which holds information even upon power-off of the LBP main body 1000. The NVRAM 11 stores mode setting information from the operation unit 1012, and flags referred to by boot processing in resetting or reactivation.

Reference numeral 12 denotes a timer which always keeps updating the current time. The timer 12 keeps updating the current time by an internal battery even after the main power supply of the LBP main body 1000 is turned off.

The MC 9 is so constituted as to allow connecting at least one external memory (not shown) such as a PC card memory other than the HD 3. This enables connecting an optional font card in addition to a built-in font, and an external memory (not shown) which stores a program (emulation program) for interpreting a printer control language of a different language system.

[Control of Print Job File]

A print job file control method and print job file boot processing will be explained with reference to flow charts shown in FIGS. 3 to 6.

Figure 3:
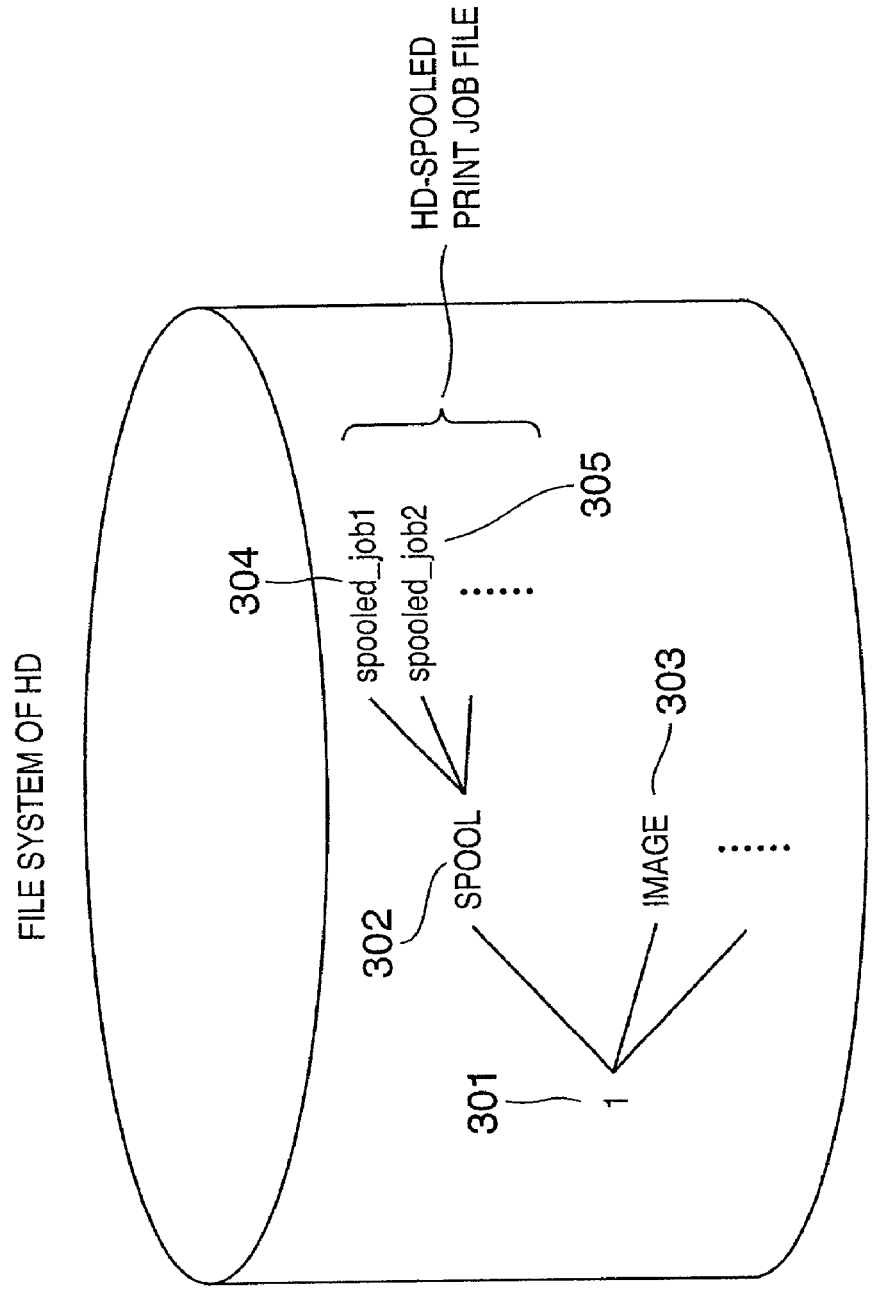
FIG. 3 is a conceptual view showing the logical structure of a file stored in a hard disk according to the embodiment of the present invention.

As shown as an example in FIG. 3, a file system having the directories of a hierarchical structure is constructed in the HD 3.

In FIG. 3, reference numeral 301 denotes a /(root directory); and 302 and 303, a SPOOL directory and IMAGE directory immediately below the root directory.

The SPOOL directory 302 stores a print job spooled in the HD 3 as a file. In the example shown in FIG. 3, a spooled job1 304 and spooled job2 305 are HD-spooled print job files. The LBP main body 1000 is set to an HD spool mode or another mode as an operation mode in accordance with an instruction input from the operation unit 1012 or from an external device (not shown) on the external network 1500. The operation mode set by this method is recorded in the NVRAM 11.

The basic operation of the LBP main body 1000 when the operation mode is set to the HD spool mode will be described. In the LBP main body 1000, a network monitoring task operates. When a print job is sent from the external network 1500 via the I/O 8, print job data is written as a print job file (to be referred to as a /SPOOL directory 302 hereinafter), e.g., as the spooled job1 304 in the SPOOL directory 302 immediately below the /(root directory) 301 of the file system formed in the HD 3. Further, a print job file processing task operates in the LBP main body 1000 independently of the network monitoring task.

[Operation of Print Job File Processing Task]

The operation of a normal print job file processing task will be explained with reference to the flow chart of FIG. 4.

In step S402, the print job file processing task monitors the /SPOOL directory 302 of the HD 3, and waits until an HD-spooled print job file is detected. If an HD-spooled print job file is detected, the task shifts to step S403.

In step S403, the task analyzes the detected print job file, and performs print processing in accordance with data included in the print job file. After all the data of the print job file are normally processed, the task advances to step S404.

In step S404, the task deletes the HD-spooled print job file in the HD 3 that has been processed in step S403. The task returns to step S402 again and waits until a print job file is detected.

[Operation of Boot Processing Task]

A print job file delete method in boot processing executed upon power-on or resetting of the LBP main body 1000 or abnormal operation of the apparatus will be explained with reference to the flow chart of FIG. 5.

In step S501, the boot processing task starts boot processing.

In step S502, the task activates a hardware check program to check whether hardware is abnormal, and then advances to step S503.

If hardware is abnormal in step S503 (YES), the task shifts to step S504 to display abnormal hardware, and ends a series of processes; if NO, shifts to step S506.

In step S506, the task initializes various devices on the LBP main body 1000 and advances to step S507. In step S507, the task executes various initialization operations of a basic OS which will run on the CPU 1, and activates the basic OS. Then, the task shifts to step S508.

In step S508, the task causes the basic OS activated in step S507 to generate and activate an HD spool initialization task (to be described later), and shifts to step S509.

In step S509, the task causes the basic OS activated in step S507 to generate and activate application tasks such as the above-described network monitoring task and print job file processing task which run on the LBP main body 1000. After the processing shifts to the applications, the task advances to step S505 to end a series of processes.

[Operation of HD Spool Initialization Task]

The operation of the HD spool initialization task generated and activated in step S508 of FIG. 5 will be explained with reference to the flow chart of FIG. 6.

In step S601, the HD spool initialization task is activated. Then, the task shifts to step S602 to check whether a print job file exists on the /SPOOL directory 302 of the HD 3.

If NO in step S602, the task advances to step S604 without any processing, and ends a series of processes.

If YES in step S602, the task advances to step S603 to delete all the print job files on the /SPOOL directory 302. Then, the /SPOOL directory 302 shifts to step S604 to end a series of processes.

As described above, according to the first embodiment, a print job file spooled in the HD 3 in boot processing is deleted by the HD spool initialization task before being processed by the print job file processing task.

As a result, even if an HD-spooled print job file includes the cause of reboot, the above processing prevents repetitive reboot processing caused by the HD-spooled print job file.

[Second Embodiment]

A print job file control method as the second embodiment of the present invention will be described.

A laser beam printer as an example of an image printing apparatus of the present invention that executes the print job file control method as the second embodiment, the arrangement of the image printing apparatus control unit of the laser beam printer, and a hard disk (HD) having the directories of a hierarchical structure will be described.

The arrangement of a laser beam printer 2000 which executes the print job file control method as the second embodiment is the same as that of the laser beam printer 1000 described in the first embodiment with reference to FIG. 1. Similarly, the arrangement of an image printing apparatus control unit 2001 is the same as that of the image printing apparatus control unit 1001 described in the first embodiment with reference to FIG. 2. In the following description, a repetitive illustration and description will be omitted.

In the laser beam printer 2000 of the second embodiment with the above arrangement, an abnormal processing switch for processing an abnormality when the abnormality occurs during the operation of the laser beam printer 2000 is arranged in an operation unit 1012, in addition to the arrangement of the laser beam printer 1000. The operation unit 1012 further comprises an informing function of detecting whether the switch has been pressed and issuing a notification.

The file system of a hard disk (HD) 3 having the directories of a hierarchical structure in the second embodiment and the operation of a normal print job file processing task will be explained.

The file system of the HD 3 with the directories of the hierarchical structure shown in FIG. 3 has the same directories of the hierarchical structure described in the first embodiment with reference to FIG. 3. Similarly, the operation of the normal print job file processing task in the second embodiment is the same as that of the normal print job file processing task shown in FIG. 4. In the following description, a repetitive description will be omitted.

The operations of boot processing and HD spool initialization task processing in the second embodiment will be described.

Figure 7:
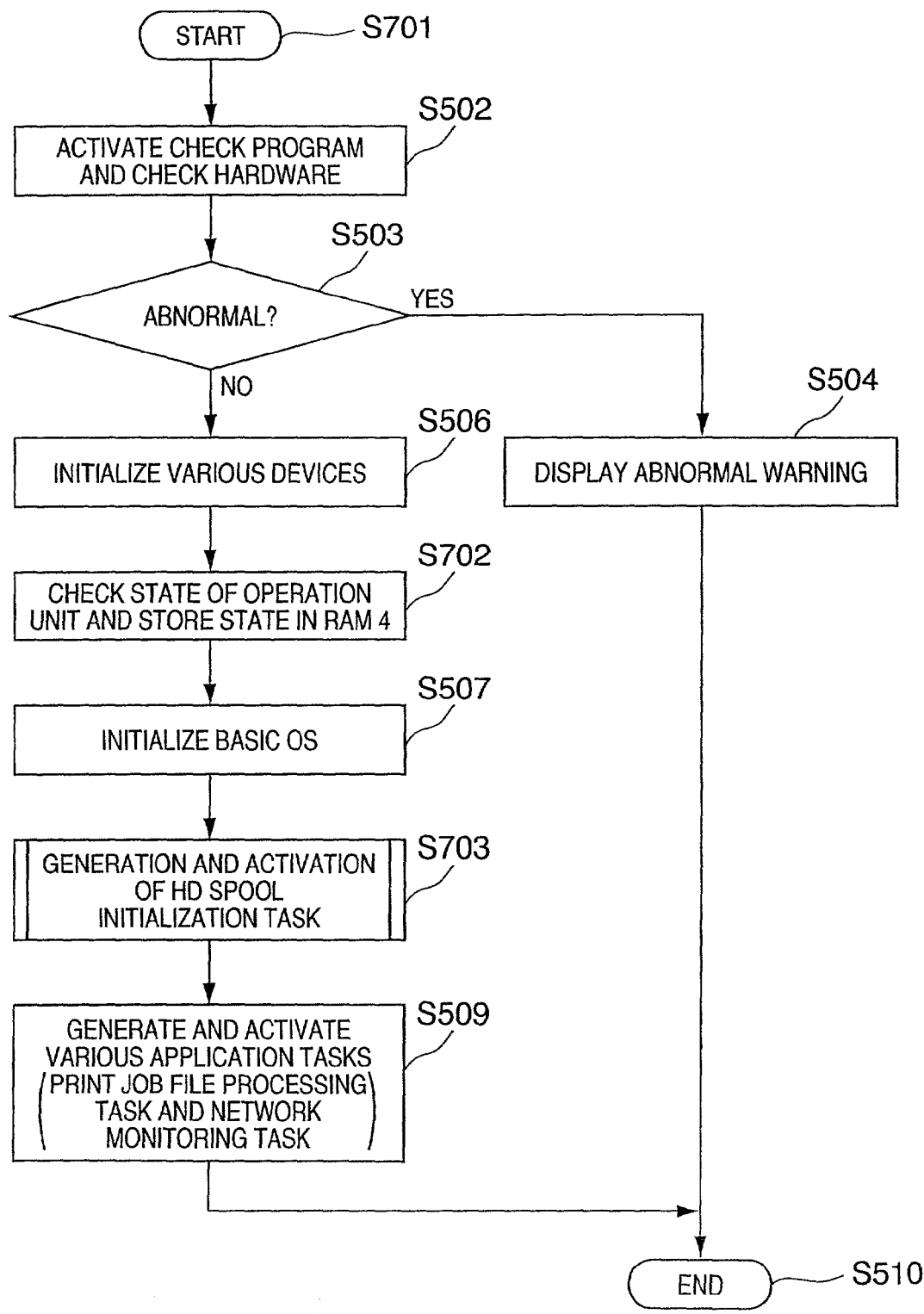
FIG. 7 is a flow chart for explaining an operation in boot processing according to the second embodiment of the present invention.
Figure 8:
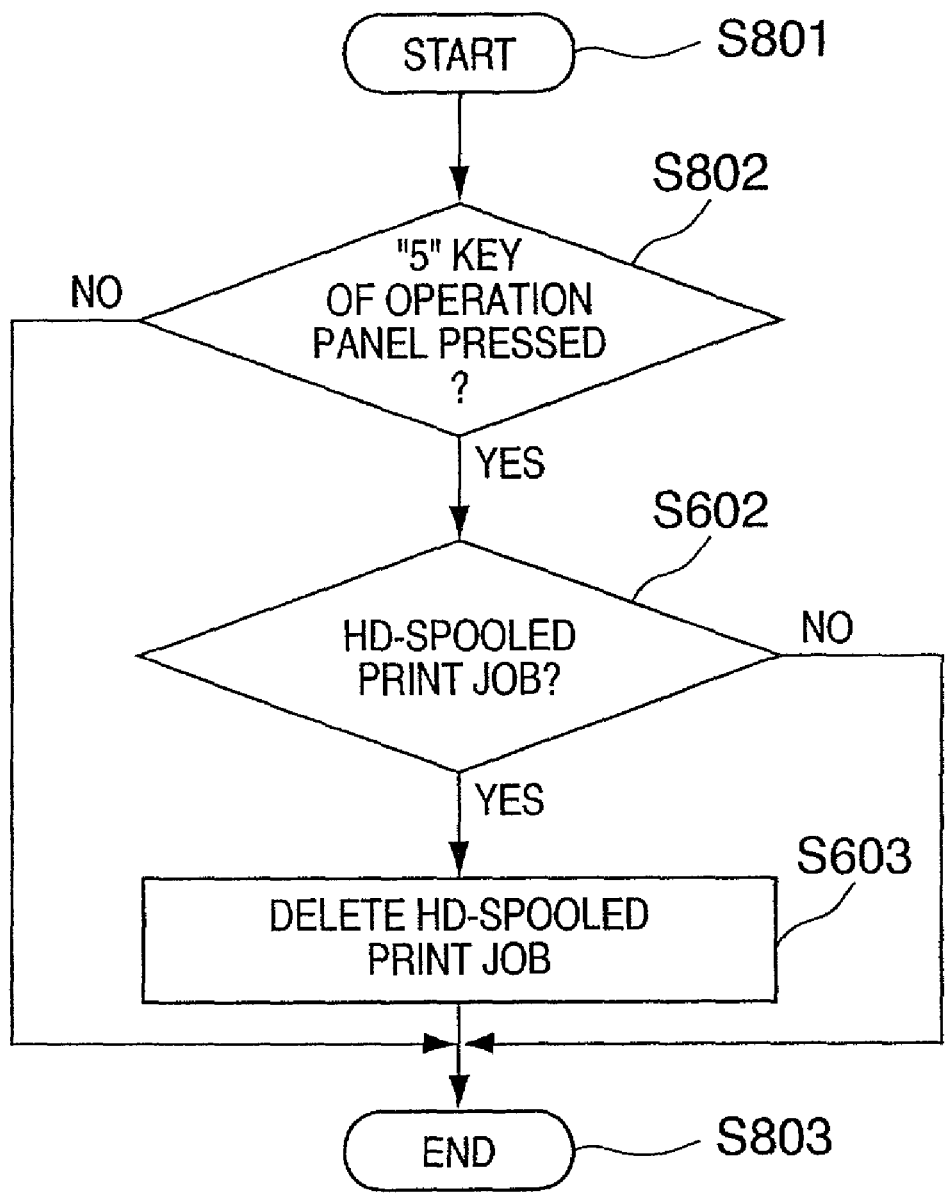
FIG. 8 is a flow chart for explaining the operation of an HD spool initialization task according to the second embodiment of the present invention.

FIG. 7 is a flow chart showing boot processing. FIG. 8 is a flow chart showing HD spool initialization task processing in the second embodiment.

The flow charts of FIGS. 7 and 8 include the same processes as the processes of the steps described in the operations of boot processing (FIG. 5) and HD spool initialization task processing (FIG. 6) in the first embodiment. In the flow chart of FIGS. 7 and 8, the same step processing numerals denote step processes common to the steps shown in FIGS. 5 and 6, and a description thereof will be omitted. The difference between the first and second embodiments will be explained in detail.

Boot processing starts in step S701 of FIG. 7, and the flow shifts to step S502.

The processes in steps S502 to S504 are the same as those shown in FIG. 5, and are abnormal warning display processing when the hardware check program is activated to detect abnormal hardware.

If no abnormal hardware exists in step S503, the flow advances to step S506 to initialize various devices. Then, the flow shifts to step S702 to check the state of the operation unit 1012, and shifts to step S507.

In the first embodiment, the flow shifts to step S507 immediately after various devices are initialized in step S506. In the second embodiment, the flow is changed to shift to step S702. In step S702, a CPU 1 communicates with an operation unit controller 10 to store the states of various switches on the operation unit 1012 in boot, and then the flow advances to step S507.

The flow executes the processes in steps S507, S703, and S509, and ends a series of processes in step S510.

The processes in steps S507 and S509 are the same boot processing as the processes shown in FIG. 5. Various initialization operations of a basic OS which will run on the CPU 1 are performed to activate the basic OS. An HD spool initialization task (to be described later with reference to FIG. 8) is generated and activated. After that, application tasks such as a network monitoring task and print job file processing task are generated and activated, and the applications execute processes.

The operation of the HD spool initialization task according to the second embodiment in step S703 will be explained with reference to the flow chart of FIG. 8.

In step S801, the HD spool initialization task starts. The task advances to step S802 to check the states of various switches on the operation unit 1012 in boot that are stored in a RAM 4 in step S702 of FIG. 7. At this time, whether, e.g., a "5" key for performing emergency processing has been pressed among various switches of the operation unit 1012 is checked.

If the "5" key for performing emergency processing has not been pressed in step S802 (NO), the task advances to step S802 to end a series of processes; if YES, to step S602.

The processes in steps S602 and S603 are the same as those shown in FIG. 6. The presence of a print job file on a /SPOOL directory 302 is checked. Only if a print job file exists, all the print job files on the /SPOOL directory 302 are deleted.

As described above, the second embodiment determines whether to delete HD-spooled data by checking the state of the operation unit 1012 in boot, i.e., whether a specific key (e.g., "5" key) for performing emergency processing has been pressed.

In the description of the second embodiment, whether the "5" key has been pressed is checked in step S802. The key is not limited to the "5" key, and the state of another key may be checked. Alternatively, determination may be made not by the state of one key but by a combination of the states of keys such that "YES" is determined in step S802 only when, e.g., a "2" key and "5" key are simultaneously pressed.

In the description of the second embodiment, the state of the operation unit 1012 is stored in step S702 and determined in step S802. Alternatively, the task may be changed to communicate with the operation unit controller 10 in the process of step S802 and may determine whether emergency processing has been done, from the state of the operation unit 1012 that is obtained by communication.

[Third Embodiment]

A print job file control method as the third embodiment of the present invention will be described.

A laser beam printer as an example of an image printing apparatus of the present invention that executes the print job file control method as the third embodiment, the arrangement of the image printing apparatus control unit of the laser beam printer, and a hard disk (HD) having the directories of a hierarchical structure will be described.

The arrangement of a laser beam printer 3000 which executes the print job file control method as the third embodiment is the same as that of the laser beam printer 1000 described in the first embodiment with reference to FIG. 1. Similarly, the arrangement of an image printing apparatus control unit 3001 is the same as that of the image printing apparatus control unit 1001 described in the first embodiment with reference to FIG. 2. In the following description, a repetitive illustration and description will be omitted.

The laser beam printer 3000 of the third embodiment with the above arrangement comprises a function of, when an abnormality occurs during the operation of the laser beam printer 3000, detecting the generated abnormality, and storing a service call ID corresponding to the abnormality contents in an NVRAM 11, in addition to the arrangement of the laser beam printer 1000.

More specifically, the presence of an abnormality such as memory overflow, an abnormal instruction, download overflow, invalid format, or the like which occurs in processing a print job file stored in a hard disk 3 is checked. If the abnormality is detected, a service call ID corresponding to the abnormality contents is stored in the NVRAM 11.

Similarly, the presence of an abnormality caused by an engine (not shown), fixing unit 1014, power supply (not shown), or rotary polygon mirror 1005 is checked from each sensor attached to the engine (not shown), fixing unit 1014, power supply (not shown), or rotary polygon mirror 1005. If the abnormality is detected, a service call ID corresponding to the abnormality contents is stored in the NVRAM 11.

The file system of the hard disk (HD) 3 having the directories of a hierarchical structure in the third embodiment and the operation of a normal print job file processing task will be explained.

The file system of the HD 3 with the directories of the hierarchical structure in the third embodiment has the same directories of the hierarchical structure described in the first embodiment with reference to FIG. 3. Similarly, the operation of a normal print job file processing task in the third embodiment is the same as that of the normal print job file processing task shown in FIG. 4. In the following description, a repetitive description will be omitted.

The operations of boot processing and HD spool initialization task processing which is a sub-routine of boot processing in the third embodiment will be described.

Boot processing in the third embodiment is the same as the flow chart of FIG. 5 showing boot processing of the first embodiment except for sub-routine processing of the HD spool initialization task in step S509. In the following description, a repetitive description of boot processing will be omitted. Only the operation of HD spool initialization task processing as the third embodiment will be explained with reference to the flow chart shown in FIG. 9.

FIG. 10 shows an example of the service call ID described in the NVRAM 11. Service call IDs can be classified into a service call ID 910 which occurs depending on print job file data, and a service call ID 920 which occurs regardless of print job file data.

FIG. 10 shows merely an example of the service call ID, and the service call ID may be another one whose contents are different from those in FIG. 10.

Figure 9:
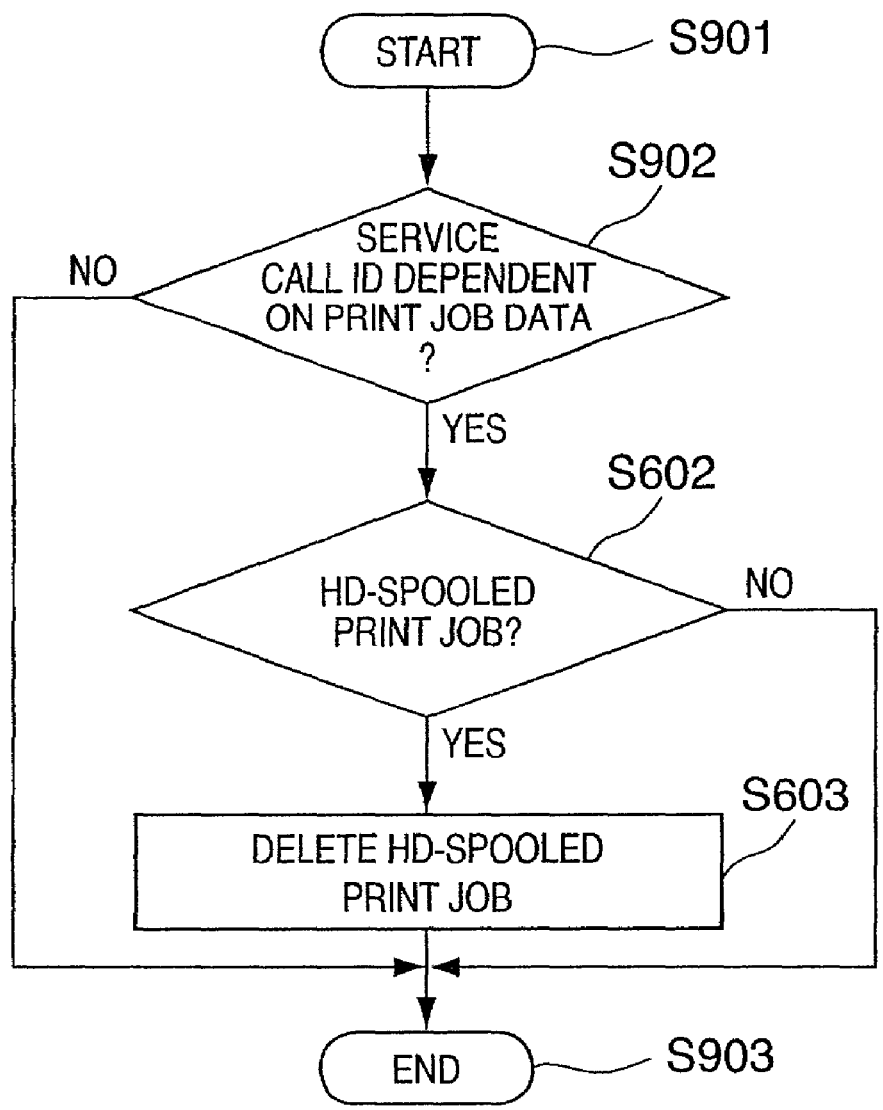
FIG. 9 is a flow chart for explaining the operation of an HD spool initialization task according to the third embodiment of the present invention.

The operation of the HD spool initialization task according to the third embodiment will be explained with reference to the flow chart of FIG. 9.

In step S901, the HD spool initialization task starts. The task advances to step S902 to check whether a service call ID that is caused by print job data shown in FIG. 10 has been stored in the NVRAM 11. If a service call ID (1 to 4) caused by print job data is detected (YES in step S902), the task shifts to step S602 to perform corresponding processing; if NO, to step S903 to end a series of processes.

The processes in steps S602 and S603 are the same as those shown in FIG. 6. The presence of a print job file on a /SPOOL directory 302 is checked. Only if a print job file exists, all the print job files on the /SPOOL directory 302 are deleted. If no print job file exists, the task ends the processing.

As described above, the third embodiment determines whether to delete HD-spooled data in accordance with the type of service call stored in the NVRAM 11 as a nonvolatile memory in boot.

[Fourth Embodiment]

A print job file control method as the fourth embodiment of the present invention will be described.

A laser beam printer as an example of an image printing apparatus of the present invention that executes the print job file control method as the fourth embodiment, the arrangement of the image printing apparatus control unit of the laser beam printer, and a hard disk (HD) having the directories of a hierarchical structure will be described.

The arrangement of a laser beam printer 4000 which executes the print job file control method as the fourth embodiment is the same as that of the laser beam printer 1000 described in the first embodiment with reference to FIG. 1. Similarly, the arrangement of an image printing apparatus control unit 4001 is the same as that of the image printing apparatus control unit 1001 described in the first embodiment with reference to FIG. 2. In the following description, a repetitive illustration and description will be omitted.

The laser beam printer 4000 of the fourth embodiment with the above arrangement comprises a function of detecting the time of boot processing of the laser beam printer 4000 and storing the detected time in an NVRAM 11, and a function of detecting the difference between the time of previous boot processing and the time of current boot processing that are stored in the NVRAM 11 and checking whether the difference is smaller than a predetermined time, in addition to the arrangement of the laser beam printer 1000.

The file system of the hard disk (HD) having the directories of a hierarchical structure in the fourth embodiment and the operation of a normal print job file processing task will be explained.

The file system of the HD with the directories of the hierarchical structure in the fourth embodiment has the same directories of the hierarchical structure described in the first embodiment with reference to FIG. 3. Similarly, the operation of a normal print job file processing task in the fourth embodiment is the same as that of the normal print job file processing task shown in FIG. 4. In the following description, a repetitive description will be omitted.

The operations of boot processing and HD spool initialization task processing which is a sub-routine of boot processing in the fourth embodiment will be described.

Figure 11:
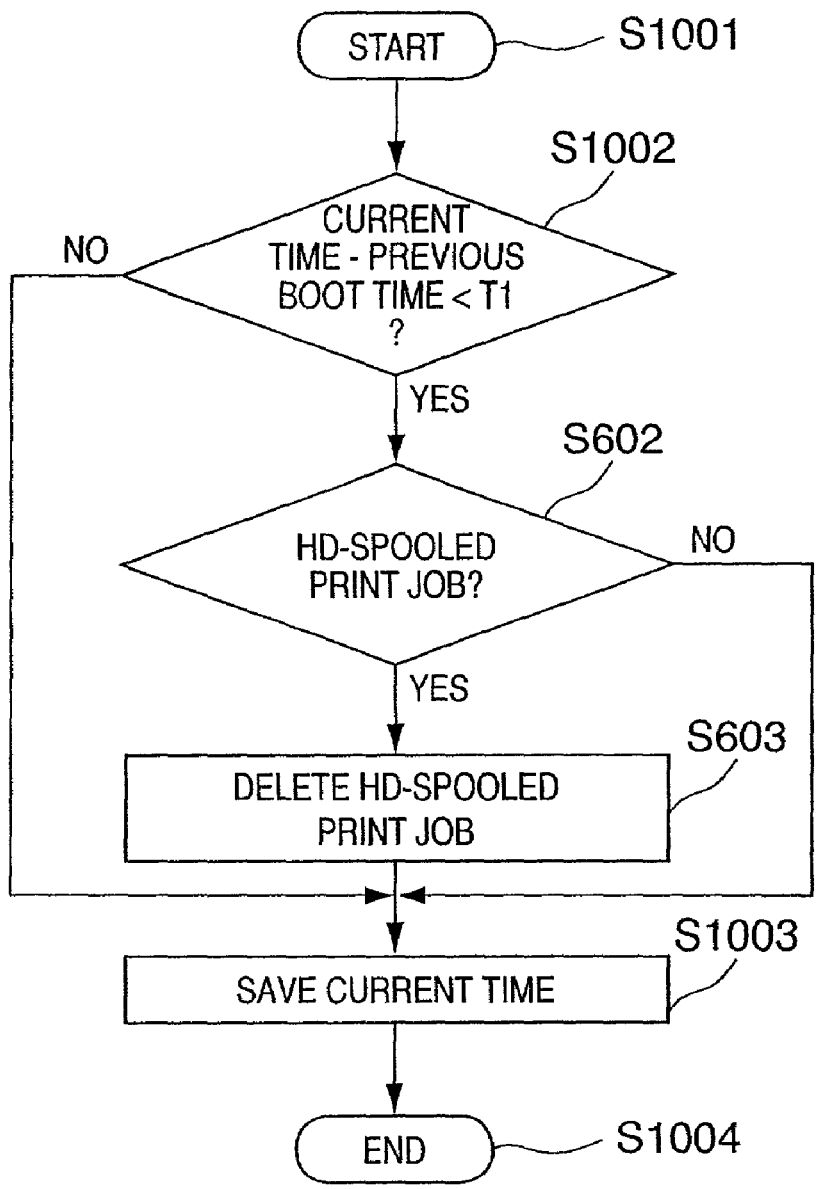
FIG. 11 is a flow chart for explaining the operation of an HD spool initialization task according to the fourth embodiment of the present invention.

Boot processing in the fourth embodiment is the same as the flow chart of FIG. 5 showing boot processing of the first embodiment except for sub-routine processing of the HD spool initialization task in step S509. In the following description, a repetitive description of boot processing will be omitted. Only the operation of HD spool initialization task processing as the fourth embodiment will be explained with reference to the flow chart shown in FIG. 11.

In step S1001, the HD spool initialization task starts. The task advances to step S1002 to acquire the current time from a timer 12. The task calculates the difference between the current time and "previous boot time" stored in a NVRAM 11 in step S1003.

If "current time"–"previous boot time" is smaller than preset T1 in step S1002, the task advances to step S602 to execute the above-described processes in steps S602 and S603, i.e., check the presence of a print job file on a /SPOOL directory 302. Only if a print job file exists, all the print job files on the /SPOOL directory 302 are deleted. Then, the task shifts to step S1003. Note that the T1 value is 20 sec as a default value, but can be arbitrarily set.

If "current time"–"previous boot time" is equal to or larger than T1 in step S1002, the task advances to step S1003 without any processing.

In step S1003, the task acquires the current time from the timer 12, and rewrites it on the previous boot time stored in the NVRAM 11. Thereafter, the task shifts to step S104 to end a series of processes.

As described above, the fourth embodiment determines whether to delete HD-spooled data in accordance with the time interval between reboot operations.

According to the above-described embodiments, generation of an error repetitively caused by a print job spooled in a hard disk or the like can be prevented by deleting all the print job files spooled in the hard disk or the like in the image printing apparatus in boot processing executed in activation, resetting, or abnormal operation.

[Other Embodiment]

The present invention may be applied to a system constituted by a plurality of devices (e.g., a host computer, interface device, reader, and printer) or an apparatus (e.g., a copying machine or facsimile apparatus) comprising a single device.

The object of the present invention is also achieved when a storage medium (recording medium) which stores software program codes for realizing the functions of the above-described embodiments is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized not only when the computer executes the readout program codes, but also when the operating system (OS) running on the computer performs part or all of actual processing on the basis of the instructions of the program codes.

The functions of the above-described embodiments are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the instructions of the program codes.

When the present invention is applied to the storage medium, the storage medium stores program codes corresponding to the above-described flow charts (shown in FIGS. 4 to 9 and 11).

As has been described above, the present invention can provide an image printing apparatus control method and image printing apparatus capable of preventing generation of an error caused by a print job spooled in a memory in boot processing executed in activation, resetting, or abnormal operation.

As many apparently widely different embodiments of the present invention can be made without departing from the spirit and scope thereof, it is to be understood that the invention is not limited to the specific embodiments thereof except as defined in the claims.

What is claimed is:

1. A control method for an image printing apparatus having a memory and spool means for temporarily storing received data as a print job file in the memory, comprising:
    a detection step of detecting during a bootstrap process whether at least a print job file is stored in the memory;
    a bootstrap time update step of detecting a present bootstrap time, and of updating a previous bootstrap time stored in a nonvolatile memory to the detected present bootstrap time;
    a comparison step of comparing the previous bootstrap time stored in the nonvolatile memory and the detected present bootstrap time, to determine a difference therebetween; and
    a print job file delete step of deleting all print job files from the memory, when at least a print job file is stored in the memory and when the difference falls within a predetermined time period.

2. The method according to claim 1, wherein the bootstrap process includes bootstrap processing performed in activation, resetting, or abnormal operation.

3. The memory according to claim 1, wherein the method further comprises:
    an operation step of executing processing for an abnormality generated in the image printing apparatus; and
    a second detection step of detecting execution of the processing for the abnormality,
    wherein in the print job file delete step, the print job files are deleted when execution of the processing for the abnormality is detected in the second detection step.

4. The method according to claim 1, wherein the method further comprises:
    an abnormality informing step of, when an abnormality occurs in the image printing apparatus, classifying contents of the abnormality into an abnormality caused by the print job file and an abnormality not caused by the print job file, and storing the contents in the nonvolatile memory,
    wherein in the print job file delete step, the print job file is deleted when the abnormality is an abnormality caused by the print job file.

5. The method according to claim 4, wherein the abnormality caused by the print job file includes at least one of memory overflow, an abnormal instruction, download overflow, and an invalid format.

6. An image printing apparatus having a memory and spool means for temporarily storing received data as a print job file in the memory, comprising:
    detection means for detecting during a bootstrap process whether at least a print job file is stored in the memory;
    a nonvolatile memory for storing a bootstrap time;
    bootstrap time update means for detecting a present bootstrap time, and for updating a previous bootstrap time stored in said nonvolatile memory to the detected present bootstrap time;
    comparison means for comparing the previous bootstrap time stored in said nonvolatile memory and the detected present bootstrap time, to determine a difference therebetween; and
    print job file delete means for deleting all print job files from the memory, when at least a print job file is stored in the memory and when the difference falls within a predetermined time period.

7. The apparatus according to claim 6, wherein the bootstrap process includes bootstrap processing performed in activation, resetting, or abnormal operation.

8. The apparatus according to claim 6, wherein the apparatus further comprises:
  operation means for executing processing for an abnormality generated in the image printing apparatus; and
  second detection means for detecting execution of the processing for the abnormality,
  wherein said print job file delete means deletes the print job files when execution of the processing for the abnormality is detected by said second detection means.

9. The apparatus according to claim 6, wherein the apparatus further comprises:
  abnormality informing means for, when an abnormality occurs in the image printing apparatus, classifying contents of the abnormality into an abnormality caused by the print job file and an abnormality not caused by the print job file, and storing the contents in said nonvolatile memory,
  wherein said print job file delete means deletes the print job file when the abnormality is an abnormality caused by the print job file.

10. The apparatus according to claim 9, wherein the abnormality caused by the print job file includes at least one of memory overflow, an abnormal instruction, download overflow, and an invalid format.

11. A computer-readable storage medium which stores a computer-executable control program for controlling an image printing apparatus having a memory and spoof means for temporarily storing received data as a print job file in the memory, wherein the control program comprises:
  code for a detection step of detecting during a bootstrap process whether at least a print job file is stored in the memory;
  code for a bootstrap time update step of detecting a present bootstrap time, and for updating a previous bootstrap time stored in a nonvolatile memory to the detected present bootstrap time;
  code for a comparison step of comparing the previous bootstrap time stored in the nonvolatile memory and the detected present bootstrap time, to determine a difference therebetween; and
  code for a print job file delete step of deleting all print job files from the memory, when at least a print job file is stored in the memory and when the difference falls within a predetermined time period.

* * * * *

UNITED STATES PATENT AND TRADEMARK OFFICE
CERTIFICATE OF CORRECTION

PATENT NO. : 7,050,183 B2 Page 1 of 1
APPLICATION NO. : 10/082301
DATED : May 23, 2006
INVENTOR(S) : Naohiro Isshiki It is certified that error appears in the above-identified patent and that said Letters Patent is hereby corrected as shown below:

COLUMN 4:
Line 39, "denote" should read -- denotes --.

COLUMN 7:
Line 49, "S506to" should read -- S506 to --.

COLUMN 13:
Line 3, "abnon-" should read -- abnor- --; and
Line 4, "nality" should read -- mality --.

Signed and Sealed this

Thirtieth Day of January, 2007

JON W. DUDAS
*Director of the United States Patent and Trademark Office*